Nov. 29, 1960 J. R. LANSBERRY 2,961,790

FINGERPRINTING METHOD AND RELATED PRODUCT

Filed June 21, 1957

INVENTOR.
Julius R. Lansberry
BY Townsend and Townsend
Attorneys

United States Patent Office 2,961,790

Patented Nov. 29, 1960

2,961,790

FINGERPRINTING METHOD AND RELATED PRODUCT

Julius R. Lansberry, 2014 Los Angeles Ave., Berkeley 7, Calif.

Filed June 21, 1957, Ser. No. 667,211

3 Claims. (Cl. 41—17)

Figure 1:
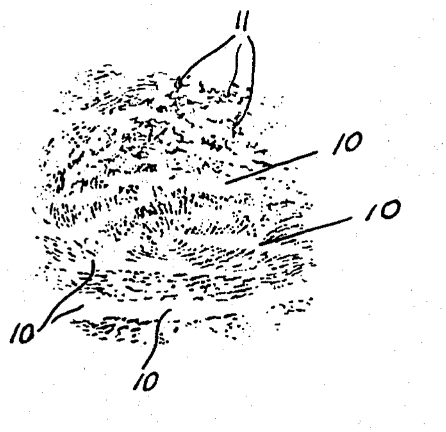

The present invention relates to the art of finger-printing and more specifically relates to a method and related product for procuring more definite, complete, and legible fingerprint impressions.

It is well known that on the inner surfaces of the human fingers, hand palms, feet and toes occur friction ridges from which ink impressions may be obtained and which generically herein is designated as the art of fingerprinting. It is believed that these friction ridges assume their shape while the individual is in the fetal state, and the pattern or arrangement of these ridges remains substantially unchanged throughout the life of the individual. However, there are a number of circumstances which may effect, temporarily or permanently, the definiteness, completeness, or legibility of fingerprint impressions obtainable from these ridge patterns. Disease or injury may permanently affect either or both pattern and/or clarity of the ridge structure. Additionally callouses, blisters, and other types of skin blemishes or rashes may temporarily affect the legibility or clarity of attainable fingerprint impressions.

A common contributing circumstance to illegibility of fingerprint impressions is the result of wrinkles which occur in the skin by virtue of increasing age or because of occupational or other environmental influences. Thus for example wrinkles occur in the skin of most elderly people for the apparent reason that the skin does not shrink proportionately to the normal shrinkage of the bulbs of the fingers which occurs because of capillary vessel circulation impairment.

In view of the foregoing there exist today serious problems with police and security agencies in securing legible fingerprints of persons for the usual varied purposes of identification, classification and the like.

A principal object of the present invention is to provide a novel fingerprinting method utilizing chemical reagents to establish a more definite, complete, and legible delineation to the human ridge structures in many of those instances where the ridge pattern of the individual has been temporarily deleteriously affected by environmental factors or by wrinkles due to old age or the like. In furtherance of such principal objective the present invention embraces the concept of providing a solution that may be applied to the human ridge structure to be fingerprinted and which will function to swell or enlarge the skin areas to be printed and to cause the ridges of the skin to rise above the level of the intervening flesh or skin whereby when an ink impression is made there will appear a minimum of voids due to intervening wrinkle lines.

More specifically the present invention takes advantage of the fact that along the peaks of the fingers, hands, toes and feet occur the rather tiny perspiration or sweat glands. As will more fully appear the solution which will hereinafter be identified more fully, includes a skin penetrating agent of a type which will irritate and apparently dilate or open the pores of the sweat glands to permit passage of the applied reagent through the skin into the capillary vessels. In this specific connection I have found that substances such as tincture of cantharides, tincture of capsicum and/or oil of mustard in alcohol solution will act as irritants to the perspiration glands, and upon application will substantially immediately cause the gland openings to swell and enlarge.

In addition to irritating and swelling the sweat glands the invention employs a vasodilator agent capable of penetrating through the dilated sweat gland openings and migrating into the capillary system to cause rapid and temporary dilation of the capillaries. In this specific regard I prefer to employ a vasodilator in the histamine class, particularly, for example, histamine dihydrochloride salt; although other histamine compounds such as histamine phosphate or histamine sulphate may be operably employed.

As an example of a specifically compounded solution of ingredients which may be applied to the skin ridge structures of a human being to accomplish the foregoing described functions and objects, the following is cited as a satisfactory example:

| Ingredient: | Percent by weight |
| --- | --- |
| Tincture of cantharides | .1 |
| Tincture of capsicum | .1 |
| Oil of mustard | .1 |
| Histamine dihydrochloride salt | .1 |
| Anhydrous isopropyl alcohol (70%–98% solution) | 99.6 |

The above exemplary solution is super-saturated as regards the histamine dihydrochloride salt. However no settling out of the salt or any of the other ingredients has been observed to occur during storage periods of the solution.

Recommended use of the above solution is made by having the individual to be fingerprinted wash his hands with soap and water. After drying, the solution may be applied with a swab to the bulbs of the fingers and allowed to dry—usually requiring about two minutes time elapse. The areas are then rinsed with water and dried. Thereafter the bulbs of the fingers are placed in contact with an ink slab and rolled, and the usual routine fingerprinting process is carried to completion.

In the average individual the dilation or swelling of the bulbs due to application of the reagent will usually be observed to have disappeared and the skin areas returned to normal within ten to fifteen minutes after application.

Figure 2:

Figs. 1 and 2 of the drawings indicate a typical or representative example of comparative fingerprint results obtainable between a print taken of a ridge structure before applicataion of the solution and that taken after application. Fig. 1 discloses the fingerprint as containing substantial voids or gaps 10 due to skin wrinkles and which interrupt and separate major areas of the ridge impression lines. The same print shows substantial areas of individual ridge line discontinuity and illegibility such as indicated at 11 in the drawings. Fig. 2 on the other hand, which is illustrative of an impression of the same subject after application of the above solution, indicates a much more complete, definite and legible impression with the wrinkle voids minimized, and with the individual ridge lines rendered more continuous and legible.

Although this invention has been described in some detail by way of illustration and example for purposes of clarity of understanding, it is understood that certain changes and modifications may be practiced within the spirit of the invention and scope of the invention.

I claim:

1. In the art of fingerprinting, the method of procuring optimum delineation of the human ridge structure to be printed comprising: the steps of applying to the ridges and adjacent skin areas to be printed a non-injurious skin irritant operable to dilate the sweat gland pores in said areas to be printed; substantially simultaneously applying to said ridge and adjacent skin areas a liquid vasodilator operable to penetrate through said dilated pores and to the capillaries adjacent said areas to swell said ridges and intervening skin areas between said ridges; and while said ridge areas remain swollen applying thereto a fingerprinting ink and making an ink impression thereof on a fingerprinting card.

2. A product useful in the art of fingerprinting comprising the solution:

| Ingredients: | Approximate percent by weight |
|---|---|
| Tincture of cantharides | .1 |
| Tincture of capsicum | .1 |
| Oil of mustard | .1 |
| Histamine dihydrochloride salt | .1 |
| Anhydrous isopropyl alcohol (70%–98% solution) | 99.6 |

3. In the art of fingerprinting, the method of procuring optimum delineation of the human ridge structure to be printed comprising the steps of: dilating the pores of the sweat glands in said areas and while said pores are in dilated condition, introducing through said pores a liquid vasodilator to dilate the capillaries adjacent said areas and swelling the ridge areas and intervening skin areas between the ridges; and while the pores are in dilated condition applying fingerprinting ink to the swollen ridge areas and making an ink impression thereof on a fingerprint card.

References Cited in the file of this patent

UNITED STATES PATENTS 2,020,376 Rich ------------------ Nov. 12, 1935

OTHER REFERENCES

Vallance: "Liniments and Chestrubs," Manufacturing Chemist and Manufacturing Perfumer, March 1942, pages 47–50 and 64.

Imadyl Unction, Modern Drug Encyclopedia, 5th edition, pub. 1952 by Drug Pub., New York, p. 479.

Merck Index, 6th ed., 1952, pub. by Merck & Co., Rahway, N.J. (p. 498, col. 1).

United States Dispensatory, Olson-Farrar, 25th ed., 1955, pub. by J. B. Lippincott Co., Philadelphia (pages 646, 650).